United States Patent [19]

Gleissner et al.

[11] Patent Number: 5,084,798
[45] Date of Patent: Jan. 28, 1992

[54] MAGNETIC TAPE APPARATUS WITH ELECTRICALLY CONDUCTIVE PLASTIC HEAD SUPPORT

[75] Inventors: Josef Gleissner; Johann Veigl, both of Vienna, Austria

[73] Assignee: U.S. Philips Corporation, New York, N.Y.

[21] Appl. No.: 538,353

[22] Filed: Jun. 14, 1990

[30] Foreign Application Priority Data

Jun. 14, 1989 [AT] Austria .................. 1452/89

[51] Int. Cl.$^5$ .................. G11B 5/10; G11B 5/55
[52] U.S. Cl. .................. 360/128; 360/105; 360/106
[58] Field of Search .................. 360/128, 105–106, 360/137

[56] References Cited

U.S. PATENT DOCUMENTS

| | | | |
|---|---|---|---|
| 4,636,895 | 1/1987 | Tomita | 360/105 |
| 4,669,012 | 5/1987 | Tomita | 360/105 |
| 4,672,492 | 6/1987 | Muramatsu | 360/105 X |
| 4,758,917 | 7/1988 | Gooch | 360/128 X |
| 4,841,395 | 6/1989 | Craft | 360/128 X |
| 4,899,239 | 2/1990 | Kido | 360/106 |
| 5,003,421 | 3/1991 | Kido | 360/106 |
| 5,003,423 | 3/1991 | Imamura et al. | 360/128 X |

*Primary Examiner*—John H. Wolff

[57] ABSTRACT

In a magnetic tape apparatus (1) with a magnetic head (28) which can be turned essentially through 180°, the magnetic head is attached on a head support (37), which is rotatably mounted by means of a bearing device (46) on the apparatus and has a channel (69) leading to the magnetic head (28), through which channel unshielded sections of leads (105, 106, 108) of a cable (107) shielded outside the channel (69) with a shield (109) are led to the magnetic head (28). In this case, the head support (37) consists of electrically conductive plastic and is electrically connected to a reference potential terminal (111) on the apparatus, as a result of which the in fact unshielded sections of the leads (105, 106, 108) within the channel (69) of the head support (37) are also shielded against interfering electromagnetic radiations.

3 Claims, 2 Drawing Sheets

MAGNETIC TAPE APPARATUS WITH ELECTRICALLY CONDUCTIVE PLASTIC HEAD SUPPORT

BACKGROUND OF THE INVENTION

1. Field of the Invention

The invention concerns a magnetic tape apparatus with a magnetic head, which can be turned essentially through 180° between two scanning positions, with a head support, which supports the magnetic head, is rotatably mounted by means of a bearing device, can be rotated between two operating positions for turning the magnetic head and has a channel leading to the magnetic head, through which channel essentially unshielded sections of leads, electrically connected to terminals of the magnetic head, of a cable shielded outside the channel with a shield are led to the magnetic head, and which channel is of an electrically conductive design and is electrically connected to a reference potential terminal on the apparatus.

2. Description of Related Art

For carrying electric signals to and from the magnetic head, a commercially available apparatus, of the type referred to above, has a cable which is shielded against interfering electromagnetic radiations by a shield, the shield, which has a relatively high rigidity and a relatively high torsional resistance, being situated away from the cable in order to ensure a necessary smooth rotatability of the head support in the region of the channel passing through the head support, with the result that the sections of the leads of the cable passing through the channel are unshielded against interfering radiations. However, since the head support is of an electrically conductive design and is electrically connected to the reference potential terminal on the apparatus, these sections of the leads are also shielded against interfering electromagnetic radiations. In the case of the known apparatus, the head support consists essentially of a base part of aluminum, to which the magnetic head is fastened, and of a bearing tube of steel, which is connected to the base part by means of screws and with which the head support is rotatably mounted in a bearing device on the apparatus, the leads being led to the magnetic head through the bearing tube and a bore in the base part, which together form the channel intended for the leading-through of leads. Such an electrically conductively designed head support has a complicated multi-part design and its production is complex and expensive.

SUMMARY OF THE INVENTION

It is the object of the invention to avoid the difficulties mentioned above and, in the case of an apparatus of the generic type mentioned at the beginning, to provide an electrically conductively designed head support which has as simple a design as possible and can be produced simply and inexpensively. For this purpose, the invention is characterized in that the head support consists of electrically conductive plastic. It is thereby achieved in an advantageous way that the electrically conductively designed head support can be produced with high accuracy as an integral part, for example in a single injection-molding operation, as a result of which as simple a design as possible and a particularly simple and inexpensive production of the head support is achieved, a shielding against interfering electromagnetic radiations also being attained for the sections of lead led unshielded through its channel, on account of its electrically conductive design and its electrical connection to a reference potential terminal on the apparatus.

The known prior art in this field offers various possibilities as electrically conductive plastics. However, it has proved particularly advantageous if the head support consists of carbon fiber reinforced polyamide. An electrically conductively designed head support which is simple to produce, cheap and, utilizing the properties of polyamide, additionally has low wear and high creep resistance is thereby obtained.

The head support consisting of electrically conductive plastic may be electrically connected, for example via a separate contact spring pressing against it, to a reference potential terminal on the apparatus. However, it has proved advantageous if the head support is electrically connected to a reference potential lead of the cable, which lead is led through the channel to the magnetic head and is electrically connected to a reference potential terminal on the apparatus. In this way, a reference potential lead of the cable which is led to the magnetic head and is provided in any case is used additionally for electrically connecting the head support consisting of electrically conductive plastic to a reference potential terminal on the apparatus.

BRIEF DESCRIPTION OF THE DRAWINGS

The invention is described in further detail below with reference to an exemplary embodiment, to which the invention is not to be restricted however.

DETAILED DESCRIPTION OF THE PREFERRED EMBODIMENTS

Figure 1:
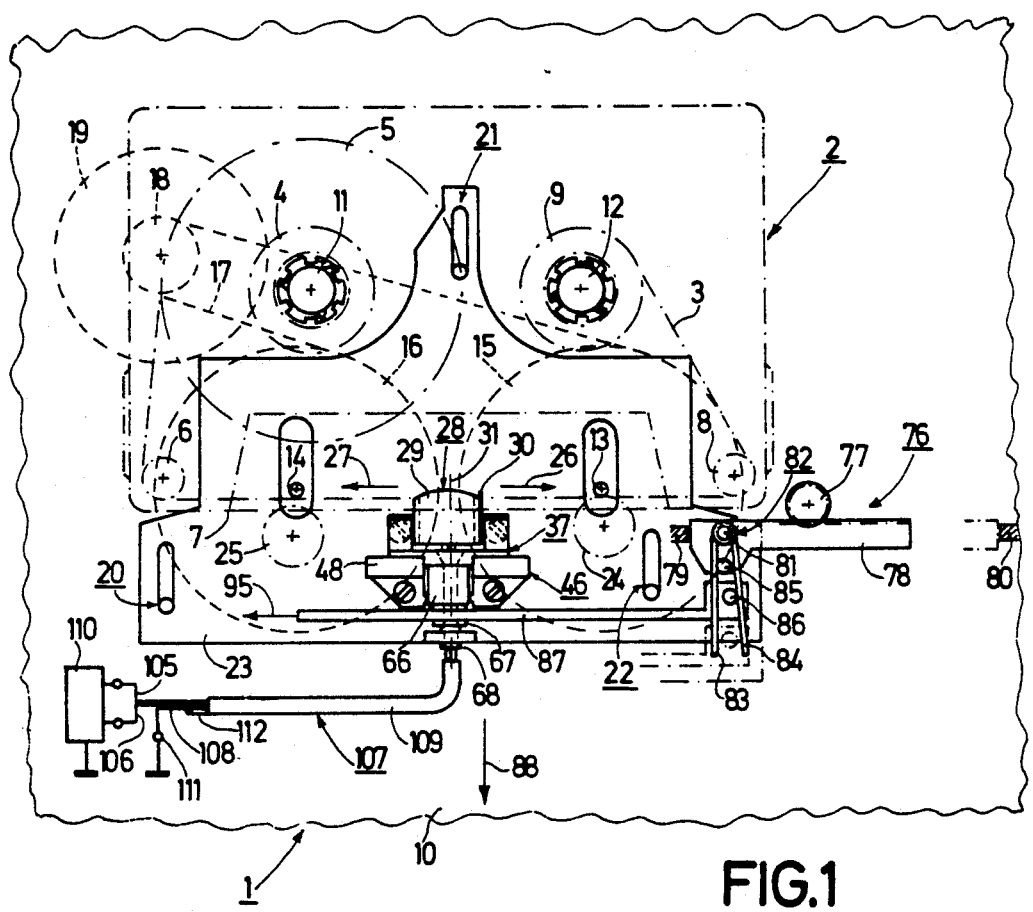
FIG. 1 diagrammatically shows in plan view a part of a magnetic tape apparatus essential for the invention, with which part a magnetic tape which can be driven in opposite tape-running directions can be scanned and which has for scanning the magnetic tape a magnetic head which is attached on a rotatable head support and can be turned through 180° between two scanning positions, for recording and playback.

FIG. 1 shows a part of a magnetic tape apparatus 1, into which a cassette 2, diagrammatically represented in FIG. 1 by dot-dashed lines, can be loaded. For this purpose, the apparatus 1 has, for example, a tray-shaped cassette compartment (not shown). A magnetic tape 3 is accommodated in the cassette 2. The magnetic tape 3 is led from a first hub 4, onto which, in the state shown, the magnetic tape 3 is wound into a tape roll 5, via a tape guide 6 and along a long narrow side 7 of the cassette and via a further tape guide 8 to a second hub 9.

The magnetic tape apparatus 1 has an essentially plate-shaped chassis 10. A first rotatingly drivable winding spindle 11, for the rotating driving of the first hub 4, and a second rotatingly drivable winding spindle 12, for the rotating driving of the second hub 9, are rotatably mounted on the chassis 10. A first capstan 13 and a second capstan 14 is also rotatably mounted on the chassis 10. Each of the two capstans 13 and 14 is connected in a rotationally fixed manner to one of two flywheels 15 and 16, respectively. A belt 17, which is led via a pulley 18, is wrapped around part of the circumferential surfaces of the two flywheels 15 and 16 in opposite winding directions. The pulley 18 can be driven at constant speed anticlockwise, according to FIG. 1, by a motor 19 fastened on the chassis 10. The second winding spindle 12 can be driven by the first capstan 13 and the first winding spindle 11 can be driven by the second capstan 14, this in a known way in each case by means of an intermediate gear mechanism, which can be selectively activated and consists for example of a plurality of gearwheels and has a slip clutch to compensate for differences in speed.

Furthermore, the apparatus 1 has on the chassis 10 a support plate 23, guided displaceably by three pin-slot connections 20, 21 and 22 perpendicularly to the long narrow side 7 of the cassette. A first pinch roller 24 and a second pinch roller 25, each indicated by dot-dashed lines and pivotally mounted on the support plate 23 by means of bearing levers (not shown), are provided on the support plate 23, one of which rollers, according to choice, can in each case be brought into resilient contact with one of the two capstans 13 and 14, the magnetic tape 3 being located between the capstan concerned and the pinch roller concerned. In this way, the magnetic tape 3 can be driven at constant tape speed by means of a rotatingly driven capstan, against which the magnetic tape is pressed by the associated pinch roller. In a "normal forward running" operating mode, the first pinch roller 24 is pressed against the first capstan 13, as shown in FIG. 1. In this case, the first capstan 13 is driven at constant speed anticlockwise, according to FIG. 1, by the motor 19, so that consequently the magnetic tape 3 is driven in the tape-running direction denoted by an arrow 26. The magnetic tape 3 is hereby wound onto the second hub 9, driven by the second winding spindle 12. In a "normal rewind" operating mode, also known as "reverse running", the second pinch roller 25 is pressed against the second capstan 14, the second capstan 14 being driven clockwise, according to FIG. 1, by the motor 19, so that consequently the magnetic tape 3 is driven in the tape-running direction denoted by an arrow 27. Then, the magnetic tape 3 is hereby wound onto the first hub 4, driven by the first winding spindle 11.

Figure 2:
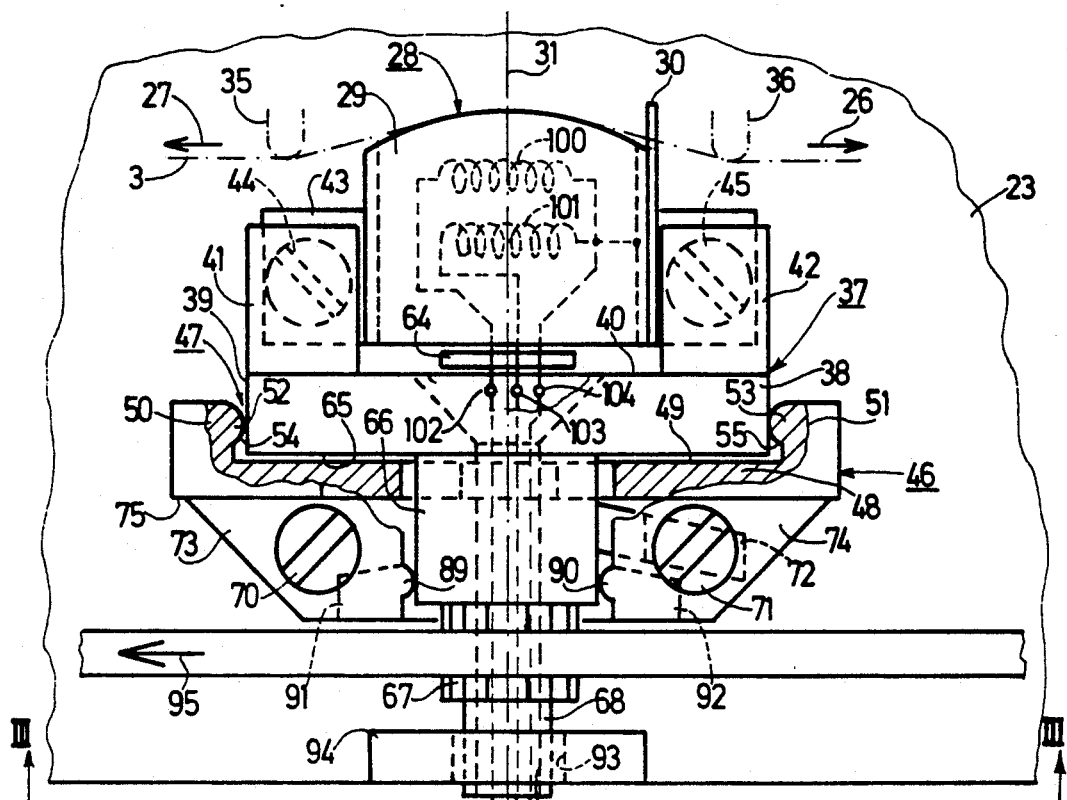
FIG. 2 shows in plan view, on a larger scale than in FIG. 1, a detail of the apparatus according to FIG. 1 with the reversible magnetic head, which is supported by the rotatable head support, which is rotatably mounted by means of a bearing device of the apparatus.
Figure 3:
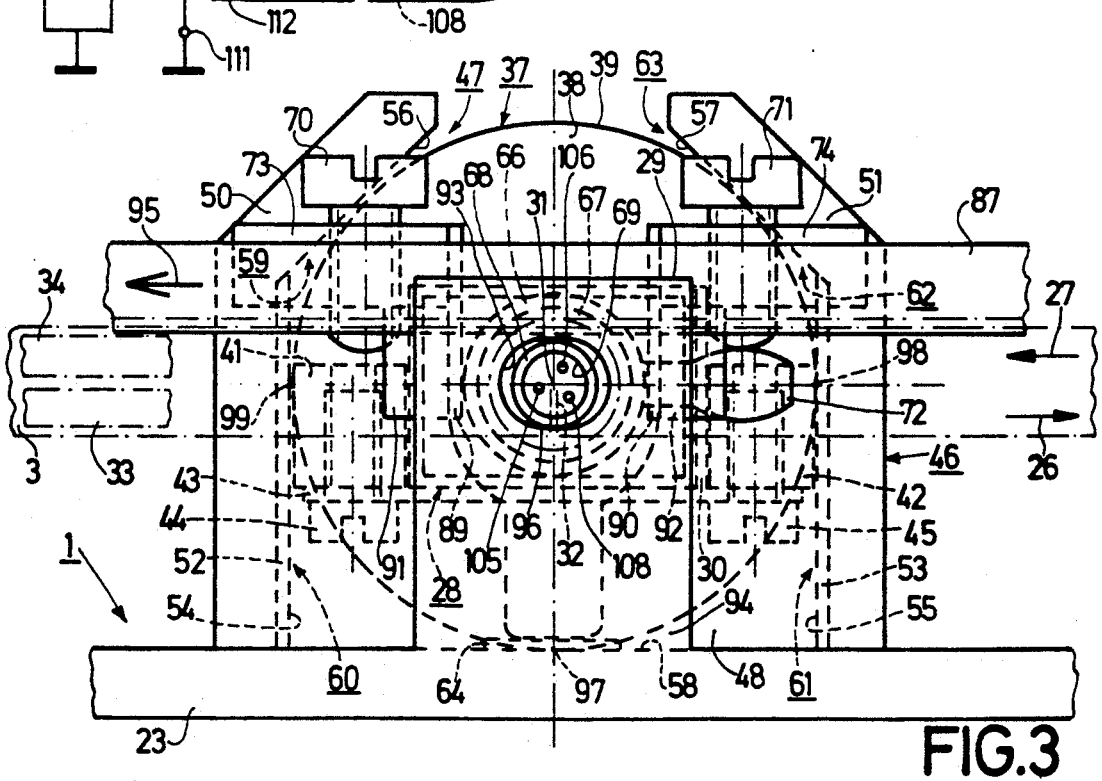
FIG. 3 shows the detail according to FIG. 2 in a section along the line III—III in FIG. 2.

A magnetic head 28, which is designed for recording and reproducing information signals, for example sound signals, is also attached on the support plate 23 of the magnetic tape apparatus 1 and a fork-shaped tape guide 30 is connected to its housing 29, consisting of mu-metal. The magnetic head 28 can be turned about a turning axis 31, running perpendicularly to the long narrow side 7 of the cassette, through 180° between two scanning positions, one of which is represented in FIGS. 1 to 3. Each scanning position is assigned to one of the two opposite tape-running directions 26 and 27. In each scanning position, the magnetic head 28 scans by means of two adjacent working clearances 32, which are diagrammatically indicated in FIG. 3, and lie eccentrically with respect to the turning axis 31 of the magnetic head 28 and each belong to a magnetic system of the magnetic head 28, and a track region of the magnetic tape 3. In FIG. 3 the two track regions of the magnetic tape 3 are denoted by the reference numerals 33 and 34. According to FIGS. 2 and 3, the magnetic tape 3 is driven in tape-running direction 26 and, accordingly, the magnetic head 28 assumes that scanning position in which it scans the track region 33 by means of its two working clearances 32. If the magnetic tape 3 is driven in the opposite tape-running direction 27, the magnetic head 28 assumes the reversed other scanning position, in which it then scans the other tape region 34 by means of its two working clearances 32. In the present case of a stereophonic recording or reproduction, the magnetic head 28 scans for each track region 33 or 34 two adjacent tracks in the track region concerned, by means of its two working clearances 32. It should be mentioned that, in the case of a monophonic recording or reproduction, the magnetic head 28 only has one working clearance and scans for each track region 33 or 34 in actual fact only a single track with this working clearance. In FIG. 2, two tape guides 35 and 36 on the cassette are indicated by dot-dashed lines, which guides ensure the necessary wrapping around the magnetic head 28 by the magnetic tape 3.

The magnetic head 28 is supported by a head support 37, which can be rotated about the turning axis 31 and is of an electrically conductive design. In the present case, the head support 37 consists of electrically conductive plastic, which can be processed in an injection-molding process. This plastic is in this case formed by a carbon fiber reinforced polyamide. Such an electrically conductively designed head support is simple and cheap to produce with high accuracy as an integral part in an injection-molding operation. By using carbon fiber reinforced polyamide, it is also advantageously achieved that the head support has low wear and high creep resistance. The head support could also consist of another electrically conductive plastic, for example of polyamide filled with conductive carbon black or of carbon fiber reinforced ABS copolymer. An electrically conductive plastic able to be processed in a compression-molding operation could also be used.

The head support 37 has a cylindrical support disc 38, which has an outer cylindrical bearing surface 39. Two block-shaped extensions 41 and 42 project in the direction of the turning axis 31 from one side surface 40 of the support disc 38 and are integrally connected to the support disc 38. A plate 43 of steel is fastened with the aid of two screws 44 and 45 of metal to these two extensions 41 and 42. The magnetic head 28 is fastened to the steel plate 43, to be precise by welding of the steel plate 43 and of the housing 29 of the magnetic head 28 of mu-metal. In this way, the magnetic head 28 is mechanically connected to the head support 37, the housing 29 of the magnetic head 28 also being electrically connected to the head support 37.

The magnetic tape apparatus 1 has on the support plate 23 a bearing device 46 with a bearing opening 47 for the rotatable bearing of the head support 37. The bearing device 46 in this case consists partly of the support plate 23 itself and of an essentially disc-shaped bearing part 48, connected to the support plate 23. The bearing part 48 is provided in the region of its side surface 49 facing the magnetic head 28 with two bearing strips 50 and 51, which are arranged mirror-symmetrically to each other and are angled off towards each other in their region facing away from the support plate 23. In their region running perpendicularly to the support plate 23, the two bearing strips 50 and 51 each have a straight-running, cross-sectionally approximately semicircularly rounded bearing rib 52 and 53, respectively, the semicircular bounding walls 54 and 55 of which each form a bounding wall, running perpendicularly to both the tape-running directions 26 and 27, of the bearing opening 47, in which the support disc 38 is rotatably mounted. Two further bounding walls 56 and 57 of the bearing opening 47 are provided on the regions of the bearing strips 50 and 51 angled off towards each other. A further bounding wall 58 of the bearing opening 47 is formed by a part of the wall, facing the magnetic head 28, of the support plate 23. This bounding wall 58 of the bearing opening 47 runs in the direction of the two tape-running directions 26 and 27. The head support 37, with its support disc 38, is rotatably mounted with play in the bearing opening 47 bounded by the previously mentioned bounding walls 54, 55, 56, 57 and 58. In practice, this play is approximately one tenth of a millimeter. As is evident from FIG. 3, the bearing device 46 is provided in the region of the bearing opening 47 with clearances 59, 60, 61, 62 and 63 for the head support 37, to be precise for its support disc 38, so that the head support 37 rests with its support disc 38 in a punctiform manner, seen in cross-section of the bearing opening, only against predetermined bearing locations in the bearing opening 47, which will be discussed in more detail below. To limit the axial mobility of the head support 37, a strip 64, protruding from the support plate 23, interacts with the support disc 38 of the said head support.

The head support 37 has on the side surface 65, facing away from the magnetic head 28, of the support disc 38 a first positioning cylinder 66, which is coaxial to the said disc and is integrally connected to the same. Integrally connected to this first positioning cylinder 66 is a gearwheel 67, coaxial to the latter. Integrally connected to the gearwheel 67 is a second positioning cylinder 68, coaxial to the latter and of smaller diameter. A bore 69 leads through the support disc 38, the first positioning cylinder 66, the gearwheel 67 and the second positioning cylinder 68 and widens conically in the support disc 38 towards the magnetic head 28. The bore 69 forms a channel, through which electric leads are led to the magnetic head 28, which will be discussed in further detail below.

As mentioned, the magnetic head 28 can be turned through 180° between two scanning positions. Accordingly, the head support 37 can likewise be rotated through 180° between two operating positions. These two operating positions are fixed with the aid of two adjustable positioning screws 70 and 71, which are provided in the apparatus and against the free ends of which there is supported, depending on the operating position of the head support 37, a positioning extension 72, protruding from the first positioning cylinder 66 in the radial direction, as is represented in FIGS. 2 and 3 for that operating position of the head support 37 which corresponds to the "normal forward running" operating mode. The positioning screws 70 and 71 are each screwed into a plate-shaped extension 73 and 74, respectively, of the bearing part 48. The two extensions 73 and 74 protrude in the direction of the turning axis 31 from the bearing part 48 on its side face 75 facing away from the magnetic head 28.

For turning the magnetic head 28 and the head support 37, the apparatus 1 has an adjusting device 76 for the head support 37, which is shown in FIG. 1. The adjusting device 76 has a gearwheel 77, which can be driven by motor, in a way not shown, in opposite directions of rotation. The gearwheel 77 meshes with a toothed rack 78, which is guided displaceably in its longitudinal direction on the chassis 10 and can be displaced back and forth between two diagrammatically indicated limiting stops 79 and 80. A leg spring 82, between the two legs 83 and 84 of which there projects a pin 85 protruding from the toothed rack 78, whereby the leg spring 82 is positioned, is fitted onto a pivot 81 protruding from the toothed rack 78. The two legs 83 and 84 of the leg spring 82 have the tendency to move towards each other. There also protrudes between the two legs 83 and 84 of the leg spring 82 a further pin 86, which is connected to a toothed rack 87, guided displaceably in its longitudinal direction on the support plate 23. The toothed rack 87 is in engagement with the gearwheel 67 of the head support 37.

In a known way, the turning of the magnetic head 28 is only possible if the magnetic head 28 is adjusted so far out of the scanning position represented in FIG. 1 in the direction of the arrow 88 that it is drawn out of the cassette 2. This adjustment of the magnetic head 28 is achieved by adjusting the support plate 23 in the direction of the arrow 88, as is indicated for a part of the support plate 23 and the end of the toothed rack 87 bearing the pin 86 by dot-dashed lines in FIG. 1. As is evident from this dot-dashed representation, even when the support plate 23 is adjusted, the pin 86 lies between the two legs 83 and 84 of the leg spring 82, so that a transmission of force from the motor-driven gearwheel 77 and the toothed rack 78 via the leg spring 82 onto the pin 86, and consequently the toothed rack 87, the gearwheel 67 and the head support 37, is ensured when the support plate 23 is adjusted. Therefore, before turning of the magnetic head 28, the support plate 23 is adjusted in the direction of the arrow 88 and, once the magnetic head 28 has been turned, the support plate 23 is adjusted back counter to the direction of the arrow 88. It is not significant for the present invention how this adjustment of the support plate 23 takes place, and it is therefore not shown.

For additional positioning of the head support 37 in its two operating positions, it is integrally connected to the first coaxial positioning cylinder 66 and the second coaxial positioning cylinder 68. To interact with the first positioning cylinder 66, two positioning ribs 89 and 90 are provided, which run perpendicularly to the two tape-running directions 26 and 27 and are approximately semicircular in cross-section. Each of the two positioning ribs 89 and 90 is provided on one of two blocks 91 and 92, protruding in the direction of the support plate 23 from the plate-shaped extensions 73 and 74 of the bearing part 48. The second coaxial positioning cylinder 68 projects through a slot-shaped opening 93, which is provided in a positioning plate 94, protruding perpendicularly from the support plate 23.

The turning of the magnetic head 28 is described below. It is assumed that the magnetic head 28 assumes that scanning position which is not represented in FIGS. 1 to 3 and in which its two working clearances 32 scan the track region 34, the toothed rack 78 then being located in the position indicated by a dot-dashed line in FIG. 1, in which position it is supported against the limiting stop 80. First of all, the support plate 23 is displaced in the direction of the arrow 88, so that the magnetic head 28 is drawn out of the cassette 2. Thereafter, the gearwheel 77 is driven clockwise, according to FIG. 1, as a result of which the toothed rack 78 is displaced into its position represented by solid lines in FIG. 1, in which position it is supported against the limiting stop 79. In this case, the pin 86 is adjusted by means of the leg spring 82, to be precise by means of its leg 84, under tension of the leg spring 82, so that the toothed rack 87 is displaced in the direction of the arrow 95. As a result, the gearwheel 67 is rotated anticlockwise, according to FIG. 3. In this way, the head support 37 is also rotated anticlockwise, to be precise until the positioning extension 72 is supported against the free end of the positioning screw 71. When this is the case, the head support 37 has reached its operating position, in which the magnetic head 28 then assumes that scanning position in which it can scan the track region 33 by means of its two working clearances 32. Thereafter, the support plate 23 is adjusted back counter to the direction of the arrow 88, the magnetic head 28 then again entering the cassette 2 and going into scanning connection with the magnetic tape 3. This operating situation is represented in FIGS. 1 to 3.

In the operating situation represented in FIGS. 1 to 3, the leg spring 82, supported against the toothed rack 78, always exerts with its leg 84, via the pin 86, on the toothed rack 87 a force which loads the toothed rack 87 in the direction of the arrow 95. The leg spring 82 consequently forms a load-exerting device which always loads the toothed rack 87 in the direction of the arrow 95 when the head support 37 is in the present operating position. By this loading with the leg spring 82, a force is always exerted by the toothed rack 87 on the gearwheel 67. This force has the effect of pressing the positioning extension 72 against the free end of the positioning screw 71. This force also has the effect of pressing the first positioning cylinder 66 against the positioning rib 89 on the block 91. This force also has the effect of pressing the second positioning cylinder 68 against the bounding wall 96, facing the support plate 23, of the opening 93 in the positioning plate 94. The pressing of the positioning extension 72 against the free end of the positioning screw 71, brought about by the toothed rack 87, has the effect of producing a torque which acts on the head support 37 and by which the support disc 38 of the head support 37 is pressed with its bearing surface 39 against the bounding wall 58, formed on the support plate 23, of the bearing opening 47, the support disc 38 of the head support 37 and the bounding wall 58 of the bearing opening 47 of the bearing device 46 resting against each other at a bearing location 97, which is punctiform in shape, seen in cross-section of the bearing opening 47. The pressing of the first positioning cylinder 66 against the positioning rib 89 on the block 91, brought about by the toothed rack 87, has the effect of producing a further torque, which acts on the head support 37 and by which the support disc 38 of the head support 37 is pressed with its bearing surface 39 against the bounding wall 55 of the bearing rib 53, the support disc 38 of the head support 37 and the bounding wall 55 of the bearing rib 53 resting against each other at a bearing location 98, which is likewise punctiform in shape, seen in cross-section of the bearing opening 47.

In the way described above, the head support 37 is positioned exactly in its operating position. In this operating position, the head support 37 is pressed with the bearing surface 39 of its support disc 38 exclusively against the two predetermined bearing locations 97 and 98. Since the head support 37 rests against the two predetermined, cross-sectionally punctiform bearing locations 97 and 98 every time it is rotated into this operating position, it is ensured that the head support 37 is always brought into the same operating position, fixed by the two predetermined bearing locations 97 and 98, in a definitely reproducible way. It is thereby achieved that the magnetic head 28 supported by the head support 37 is brought into always the same scanning position in a definitely reproducible way, so that always constantly good scanning conditions by the magnetic head 28 are ensured.

As is evident from FIGS. 2 and 3, in the operating position shown of the head support 37, the magnetic tape 3 runs in the tape-running direction 26 over the magnetic head 28. In so doing, the magnetic tape 3 exerts a frictional force on the magnetic head 28. This frictional force runs in the tape-running direction 26 and has, via the magnetic head 28, the consequence of a torque which acts on the head support 37 and assists the pressing, brought about by the leg spring 82, of the head support 37 with its support disc 38 against the bearing location 98 in the bearing opening 47. It is thereby ensured that the magnetic head 28 always remains securely in its scanning position even if there is a high frictional force acting on the magnetic head 28.

In the operating position of the head support 37 which is not represented and is turned with respect to the operating position described above and represented in FIGS. 1 to 3, the leg spring 82 provided as the load-exerting device always exerts a force counter to the direction of the arrow 95 on the toothed rack 87. As a result, a force by which the positioning extension 72 is pressed against the free end of the other positioning screw 70, the first positioning cylinder 66 is pressed against the other positioning rib 90 on the block 92 and the second positioning cylinder 68 is again pressed against the bounding wall 96 of the opening 93 in the positioning plate 94 is always exerted by the toothed rack 87 on the gearwheel 67 of the head support 37. Furthermore, in this case the support disc 38 of the head support 37 is pressed against the bounding wall 58 of the bearing opening 47 and against the bounding wall 54 of the other bearing rib 52 in the bearing opening 47, the support disc 38 of the head support 37 then again resting exclusively against two predetermined, cross-sectionally punctiform bearing locations on the bearing device 46, namely against the bearing location 97 and against a further bearing location 99 on the bounding wall 54 of the bearing rib 52, so that the magnetic head 28 always assumes the same scanning position, and therefore always constantly good scanning conditions by the magnetic head 28 are ensured, in this operating position of the head support 37 as well.

As already mentioned, the magnetic head 28 has two magnetic systems, which scan for each track region 33 and 34, respectively, two adjacent tracks by means of their working clearances 32. Each of these two magnetic systems has a coil 100 and 101, respectively, diagrammatically represented in FIG. 2. One end of the one coil 100 is electrically connected to a terminal 102 of the magnetic head 28, which terminal is formed by a soldering pin. One end of the other coil 101 is electrically connected to a further terminal 103 of the magnetic head 28, which terminal is formed by a soldering pin. The other ends of the two coils 100 and 101 are electrically connected to each other and to the housing 29 of the magnetic head 28 and to a further terminal 104 of the magnetic head 28, which terminal is formed by a soldering pin. The two terminals 102 and 103 of the magnetic head 28 are each connected to a signal lead 105 and 106, respectively, of a cable 107 and the terminal 104 of the magnetic head 28 is connected to a reference potential lead 108 of the cable 107. The cable 107 is in fact shielded against interfering electromagnetic radiations by a shield 109. Away from the magnetic head 28, the leads 105, 106 and 108 of the cable 107 are led through the channel 69, designed as a bore, in an unshielded way, since the shield 109 of the cable 107 is removed in the region of the channel 69, this being so as not to hinder the smooth rotatability of the head support 37 by the relatively high rigidity and the relatively high torsional resistance of the shielded cable 107. Directly the leads 105, 106 and 108 leave the channel 69, the said leads are shielded against interfering electromagnetic radiations by the shield 109. The shield 109 could also protrude slightly into the channel 69.

As FIG. 2 also shows, the two signal leads 105 and 106 are connected to a diagrammatically represented signal-processing circuit 110 for processing signals to be recorded by the magnetic head 28 or for processing signals reproduced by the magnetic head 28. The reference potential lead 108 of the cable 107 is electrically connected to a reference potential terminal 111 on the apparatus. In this case, the shield 109 is likewise electrically connected to the reference potential lead 108, and consequently to the reference potential terminal 111, via an electrical connection 112.

The head support 37, consisting of electrically conductive plastic, is electrically connected via the two screws 44 and 45 of metal, the steel plate 43, the housing 29 of the magnetic head 28 of mu-metal and the terminal 104, electrically connected to the housing 29, to the reference potential lead 108 and via the latter to the reference potential terminal 111 on the apparatus. In this way, the sections of the leads 105, 106 and 108 in fact unshielded in the channel 69 are also shielded against interfering electromagnetic radiations by means of the head support 37, which consists of electrically conductive plastic and is electrically connected to the reference potential terminal 111. In this way, the reference potential lead 108 which is led in any case to the magnetic head 28 is simply used additionally for electrically connecting the electrically conductively designed head support 37 to the reference potential terminal 111, so that there is no need for a separate electrical connection between the head support 37 and the reference potential terminal 111.

We claim:

1. In a magnetic tape apparatus with a magnetic head, which can be turned essentially through 180° between two scanning positions, with a head support, which supports the magnetic head and is rotatably mounted by means of a bearing device which can be rotated between two operating positions for turning the magnetic head, which bearing device has a channel leading to the magnetic head, through which channel essentially unshielded sections of leads which are electrically connected to terminals of the magnetic head and which are part of a cable which is shielded outside the channel and which channel is of an electrically conductive design and is electrically connected to a reference potential terminal on the apparatus, wherein the improvement comprises a head support which consists of electrically conductive plastic.

2. Apparatus according to claim 1, characterized in that the head support consists of carbon fiber reinforced polyamide.

3. Apparatus according to claim 1 or 2, characterized in that the head support is electrically connected to a reference potential lead of the cable, which lead is led through the channel to the magnetic head an is electrically connected to a reference potential terminal on the apparatus.

* * * * *